March 27, 1928. 1,663,816
A. BONAVIA Y RIPOLL ET AL
APPARATUS DESTINED TO PROTECT CHECKS AND SIMILAR DOCUMENTS
Filed July 22, 1926 4 Sheets-Sheet 1
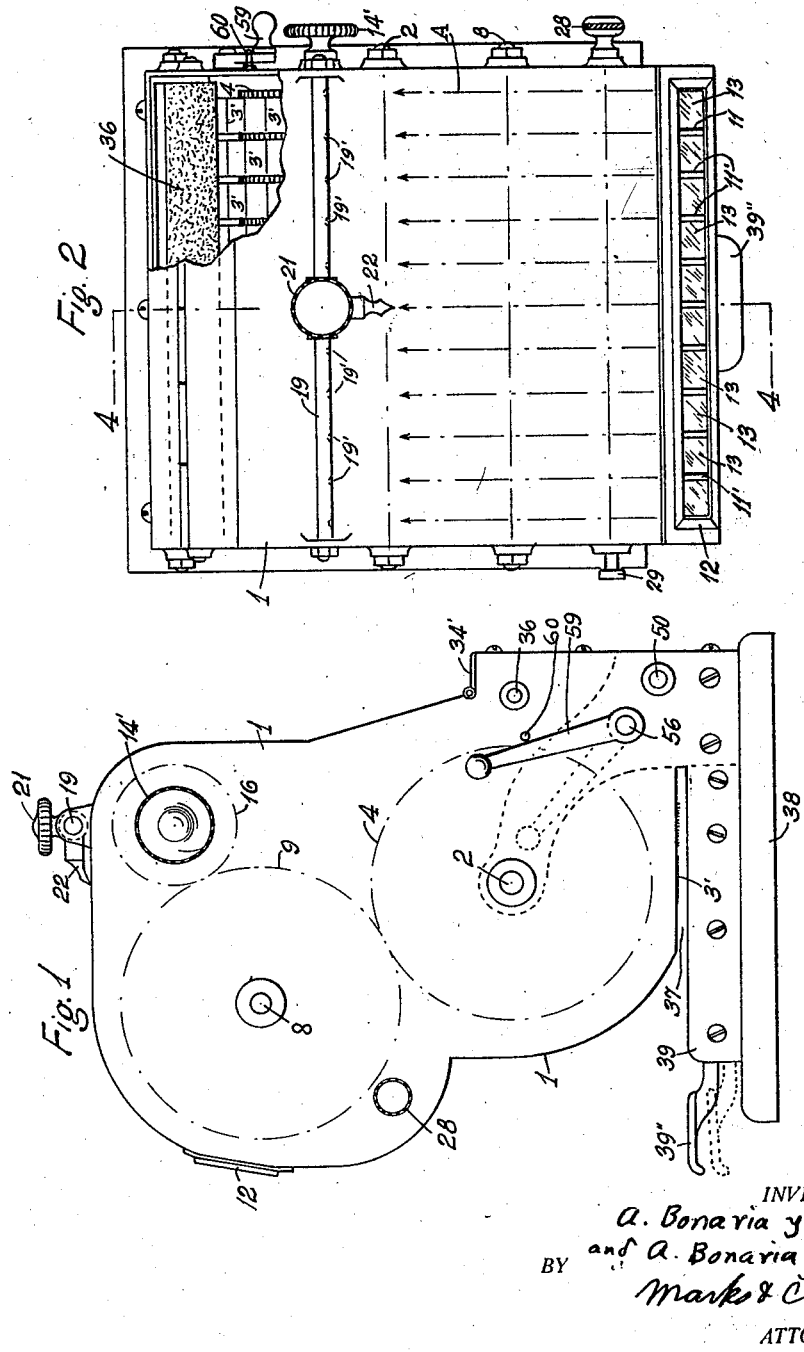
INVENTOR.
A. Bonavia y Ripoll
BY and A. Bonavia y Ripoll
Marks & Clerk
ATTORNEY.

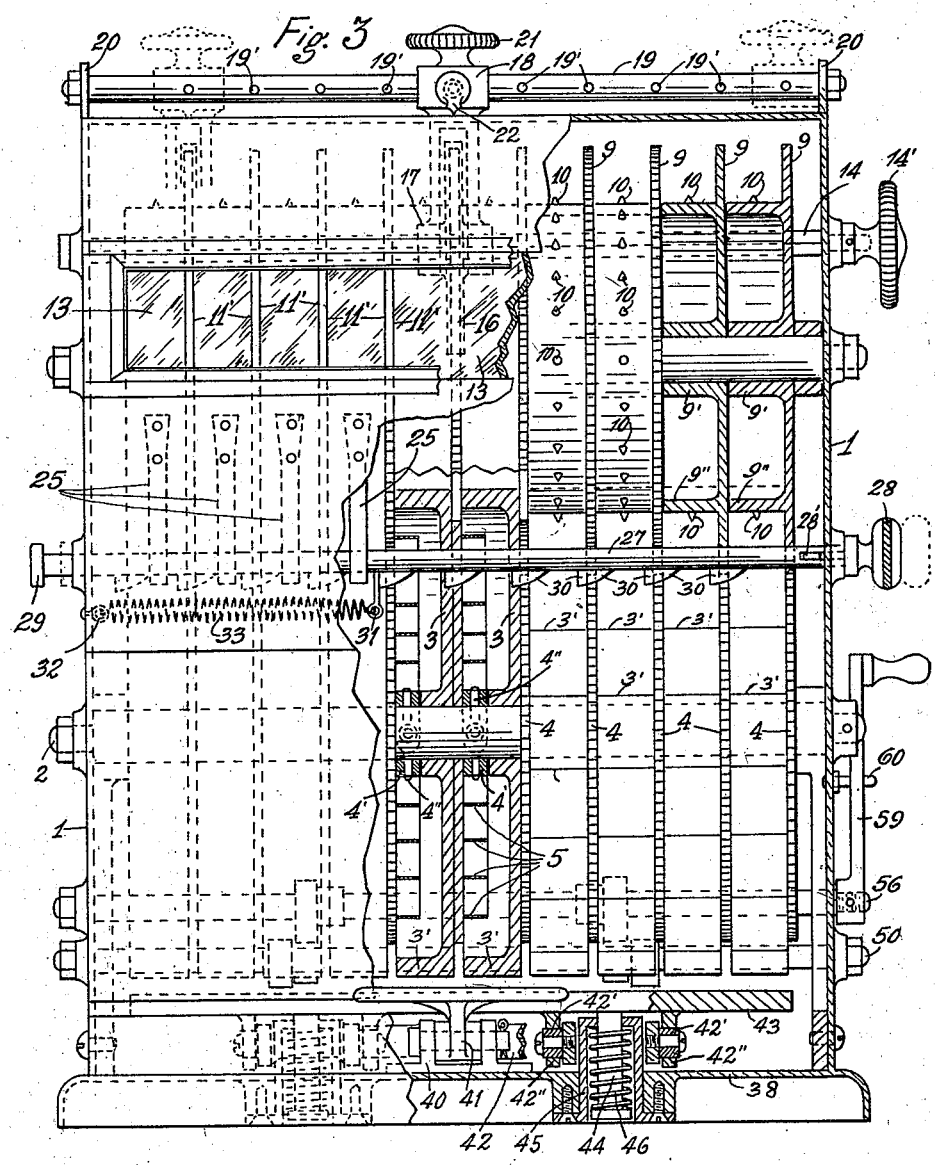

March 27, 1928.
A. BONAVIA Y RIPOLL ET AL
1,663,816
APPARATUS DESTINED TO PROTECT CHECKS AND SIMILAR DOCUMENTS
Filed July 28, 1926   4 Sheets-Sheet 4
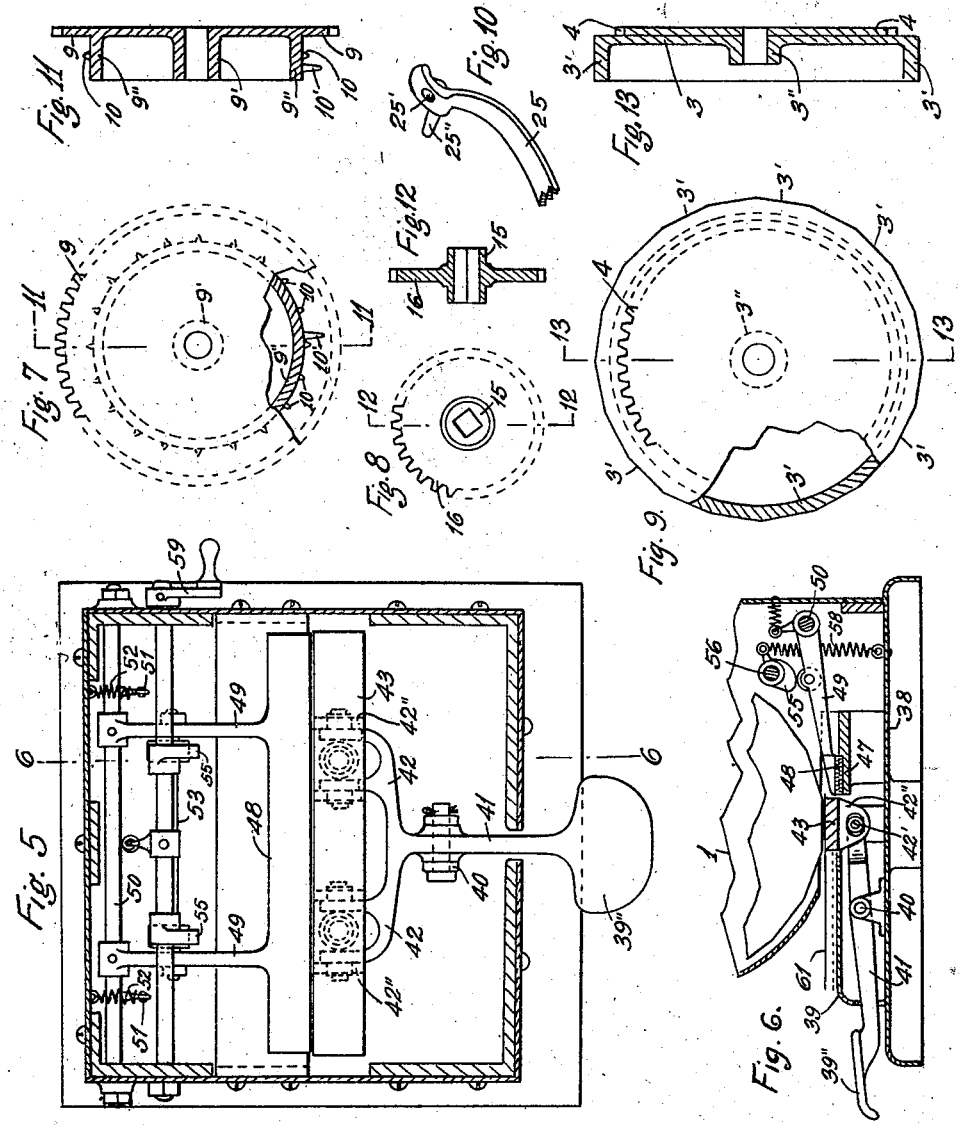
INVENTORS:
A. Bonavia y Ripoll
& A. Bonavia y Ripoll
BY Marks & Clerk
ATTORNEYS.

Patented Mar. 27, 1928.

1,663,816

UNITED STATES PATENT OFFICE.

ALBERTO BONAVIA Y RIPOLL AND ARTURO BONAVIA Y RIPOLL, OF HABANA, CUBA.

APPARATUS DESTINED TO PROTECT CHECKS AND SIMILAR DOCUMENTS.

Application filed July 28, 1926, Serial No. 125,501, and in Cuba July 12, 1926.

This invention refers to an apparatus designed to protect checks, vouchers, stubs or other similar documents, printing on the same in an indelible manner the amounts for which they are drawn, so as to make impossible the alteration of the amount for which the check is drawn and supplanting the printed amount by a larger amount.

In the present invention, total and simultaneous printing of the amount for which the check is drawn may be obtained, not by numbers, but by words expressive of the different figures component of the said amounts, thus being a decided improvement in apparatus of this kind, as in those known up to the present time, the printing of the amount in question was effected by numerals which facilitated the fraudulent alteration of same; or in other mechanisms of this kind required the printing of the words, which constituted the amounts separately from each other.

This apparatus has the further advantage that it is practically impossible, when printing the amount for which the check is drawn, to leave blank spaces, an inconvenience which happens at present in apparatus of this kind, especially when operated by inexperienced persons.

Our invention avoids this and also other inconveniences, and new objects and advantages will be seen, especially by those expert in the art to which this invention pertains, with the aid of the figures in the attached drawings, in which the same reference characters designate the same parts.

In the drawings:

Figure 1, is a side elevation of a preferred form of the invention.

Figure 2, is a top plan view partly in section of the apparatus.

Figure 3, is a front elevation, partly in section and on an enlarged scale, of the apparatus.

Fig. 5, is a horizontal section in detail taken on line 5—5 of Fig. 4.

Fig. 6, is a vertical section in detail taken on line 6—6 of Fig. 5.

Figs. 7-8-9-10, are detailed views of different component parts of the apparatus.

Fig. 11, is a diametrical section taken on line 11—11 of Fig. 7.

Fig. 12, is a diametrical section taken on line 12—12 of Fig. 8.

Fig. 13, is a diametrical section taken on line 13—13 of Fig. 9.

Figure 4:
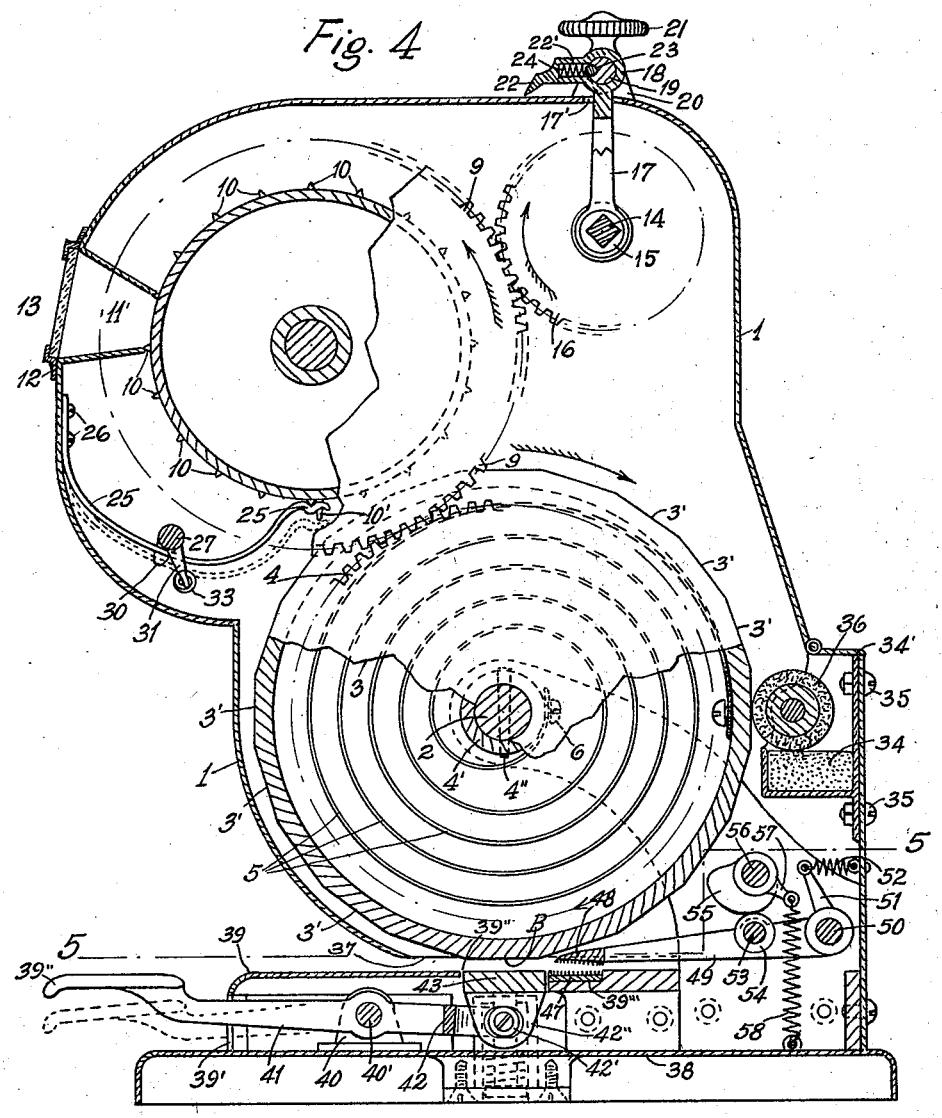
Fig. 4, is a vertical section on an enlarged scale taken on line 4—4 of Fig. 2.

The mechanisms of the apparatus are inclosed in a metallic casing or covering 1. Between the sides of same and towards the rear part thereof is a horizontal shaft 2 along which is mounted loosely a plurality of plates or printing disks 3, each of which as detailed in Figures 9 and 13, has on one of its sufaces peripheral printing flanges 3′ and hubs 3″ to fit spacedly on the shaft 2. The flanges are of a regular polygonal shape and on each face of said flanges is embossed the words "One", "Two", "Three", etc., up to "Nine". There are also provided the words "Thousand", "Hundred", "Dollars", "Cents", or any other words necessary for printing checks. Stars or other symbols may also be embossed on the printing wheels or any other signs which mark the zero and serves to fill the blank spaces, although it is evident that these embossings may be varied in any convenient form. At the same time the outer surface of each side of the flange 3′ is pointed to constitute an indenting surface. On the lower surface of each plate and on the shaft 2 itself are secured gears 4, said gears being maintained in position spacedly by means of collars 4′ set between each of the gears and fastened to the axle 2 by pins 4″. In the housing formed by each flange 3′ of each plate 3, is coiled a leaf spring 5 the inner end which is fastened at 6 to the collar 4′ fixed to the shaft 2 and its outer end being fastened at 7 to the inner surface of the flange 3′ of the plate 3. In the upper part of the casing 1 and between its sides, is placed a second horizontal shaft 8 on which is loosely mounted a plurality of gears 9 which mesh with the gears 4, being of a smaller diameter than same, and said gears 9 being provided with spacing hubs 9′ and with a cylindrical flange 9″, from the outer surface of which projects spacedly the points 10, one of these marked as 10′ projecting further than the others, the purpose of which will be explained hereinafter. On the outer surface of each flange 9″ between the points 10 is embossed a series of words and signs corresponding with the embossing on the flanges 3' of each plate, these words etc. being made visible on the outside through a funnel shaped slot 11 open in the upper front part of the casing 1 through the whole width of same. On the borders of said slot is fitted a frame 12 to hold and cover a magnifying lens 13, the slot 11' being divided by a plurality of vertical partitions 11, between each two of which, is one of the gears 9, bearing the embossed words. The meshing of each gear 9 with each gear 4 is combined in such a manner, that when one of the words which one of the gears 9 bears becomes visible through the magnifying lens 13 the surface of the flange 3' which bears a similar word occupies a position marked by the letter B in Fig. 4, that is the horizontal lower position of said surface.

The square shaft 14 on one end of which is outerly secured a knob 14', is mounted behind the shaft 8 and on a higher plane than same, having arranged slidably on same a square hub 15 and to which is fixed a gear 16; the movement of the hub 15 and gear 16 along the axle 14 is regulated by means of a forked guide 17 passing through a slot 17'; opened in the whole width of the upper part of the casing 1. At its upper end the guide 17 terminates in a hub 18 slidably fitted along a horizontal shaft 19 supported between ears 20, which project from the sides of the upper part of the casing 1, and with which hub is embodied a nut 21, the hub 18 also having an extension 22 in the form of indicator movable along a scale A on the upper part of the casing 1, the object of which will be explained hereinafter. Within the extension 22 is a socket 22' in which is housed a small stop 23 actuated by a spiral spring 24 and which stop is designed to engage one of the different notches 19' extending along the shaft 19 in the various positions of the hub 18, when being moved along said shaft.

Each one of the gears 9 is maintained in operation, as will be seen hereinafter, by means of stop device, which, as partially detailed in Figure 10, is comprised of a spring 25 secured at one end by screws 26 on the inner surface of the front wall of the casing, and ending in a slightly rounded head in which is a recess or notch 25', designed to connect in one of the points 10 which project from the circular flanges 9", presenting also a stern or stop 25", the purpose of which will be explained hereinafter.

A horizontal shaft 27 is arranged to be moved longitudinally between the sides of the casing 1, in the front part of same, upon springs 25, the ends of said shaft extending from the casing. Fastened to one end of the shaft 27 is the knob 28, at its other end is a head 29. By means of key 28' on the knob 28 the movement of the shaft is guided. From said shaft and spaced along its full length, extend cam ears 30, and also fastened to shaft 27 is an eyebolt 31 from which, and from another eyebolt 32 fastened to one of the sides of the casing 1, is secured the ends of a spiral spring 33, which tends to draw the shaft 27 in the direction of the contraction of said spring.

The casing 1 has an enlargement to house a receptacle 34 for ink of a special kind which is secured by screws 35 to the inner surface of the lower wall of said enlargement, an opening with a cover 34' being provided for supplying ink to same. The ink is transferred to the polygonal printing disks by means of a horiontal inking roll of felt or other similar material 36 mounted between the sides of the enlargment in the rear of the casing 1.

As shown at 37, the casing 1 is open in its lower end and terminates in a bearing plate 38 concaved on its lower surface and to which is soldered or secured a casing 39. On the casing 39 is a standard 40, on which is pivoted, by a pin 40, a lever 41, one of the arms of which extends outwardly through a slot 39' and ends in a handle 39", the other end terminates innerly to the casing 39 in two forked arms 42, each of said arms bearing a small roller 42' which work in slots in the ears 42" under a platform or movable bearing plate 43, in one of the slots 39" in the upper part of the casing 39.

The plate 43 is designed to make contact with the surface of the side B of each flange 3' of the printing and perforating surface. The upper surface of said plate 43 is pointed to constitute a perforating surface cooperating with the surface of the corresponding flange B.

Pins 44 project downwardly from the plate 43 and extend into guide hubs 45 inserted through slots in the bearing plate 38 and around said pins are coiled the spiral springs 46 which tend to draw the said plate 43 downwardly. The rear edge of the slot 39" is recessed in its upper surface for its full length as shown at 39''' and in this recess is placed a perforating plate 47 cooperating with a perforating plate 48, on which is embossed any suitable numbers, words or letters. The plate 48 is held by two arms 49 secured on a horizontal shaft 50 arranged between the sides of rear enlargement of the casing 1 and from which shaft projects an arm 51 to which is connected a spiral spring 52 the other end of which is secured to the interior side of the rear wall of the casing.

Between the arms 49 is secured a horizontal shaft 53 on which are loosely mounted small rolls 54 in connection with the cam blocks 55 secured on a horizontal shaft 56 arranged between the sides of the rear enlargement of the casing 1. Secured to said shaft 56 is an arm 57 to which is connected one end of a spiral spring 58, the other end of which is connected to an eyelet fastened to the platform 38.

A handle 59 is fastened to the outer projecting end of the shaft 56, its operating movement being limited by a stop 60.

The operation of this apparatus is as follows: In the non-operative position, the surfaces of the polygonal flanges 3', on which are embossed the special signs for filling the blank spaces, generally in the form of stars, will face the plate 43, as shown in B of figure 4, said position being denominated as zero. Supposing that it is desired to draw a check for the amount of four hundred and fifteen dollars and ten cents. Taking into consideration then, using the scale A, that said amount requires the combination of six printing disks, the hub 18 is moved by means of the knob 21 until the point 22 coincides with the graduating line A which corresponds to the first of the six disks required. In this manner the forked-guide 17 brings the gear 16 into mesh with the gear 9 which corresponds to the line of graduation indicated. Then the shaft 14 is made to turn by means of the knob 14', and the gear which meshes with the respective gear 9 will cause the rotation of same, and the successive appearance through the magnifying lens of the different words embossed in the flange of same until the word "Four" appears.

The gear 9 which is in mesh with one of the gears 4 secured to each plate 3' will cause the turning and at the same time inking of the flange 3' of same on the inking roll 36 and at the moment that the word Four is visible through the glass 13 the surface of the flange 3', on which is embossed the said word, will face the plate 43 at the same time and as the gear 9 is turned said gear is stopped by the engagement of the notch 25' of the coresponding spring 25 with each one of the points 10, preventing thereby the escape of the gear 4 on the tension of the spring 5. The operation being the same to place successively the words "Hundred" and "Fifteen" and on the two following disks the word "Dollars", the word "Ten" and the word "Cents" which corresponds to the last plate of the series.

Then the check or document is placed through the opening 37 and the handle 39 is pressed raising the plate 43 to come in contact with the ink surface of the flanges 3' which bear the words "Four hundred fifteen dollars ten cents" as shown in Figure 6, the amount being printed and embossed indelibly on the corresponding line of the check and the rest of the line designed for the amount of the check being filled by signs in the form of stars. When the pressure on the handle 39" is released the plate 43 returns to its former position under the pressure of the springs 46. After this the crank 59 is turned and the cam blocks 55 mounted on the shaft 56 will act upon the rollers 54 on the axle 53 and will lower the embossing plate 48 to come in contact with the stationary embossing plate 47 pressing between the two shafts that portion of the check on which appears the name of the person in whose favor the check is drawn, or the name of the drawer, etc., leaving impressed indelibly in embossed form a countersign. After releasing the pressure of the crank 59 the tension of the spring 52 again raises the arms 49 which bears the embossing plate 48 and the springs 58 cause the shaft 56 bearing the cam blocks 55 to return to its initial position.

To return the mechanism to the zero position, the knob 28 is pulled, displacing the shaft 27 in the position shown by dotted lines in Figure 3 and then it is made to turn the cam ears 30 effecting the disengagement of the points 10 in the notches 25' from the springs 25. Due to the reaction of the springs 5 the disks 3 acted on previously turn in an opposite direction to that given when moved by means of the moving gears 16 and the gear 4 joined to same will cause the gear wheel 9 to turn until it stops in the notch 25' in the projection 10 of same. At that moment only the surfaces bearing the signs in the form of stars on the flanges 35 will be facing in the direction of the plate 43 so that the apparatus will be in the position which we may call zero. In the drawings, the apparatus has been shown as having ten printing disks, but the number in actual practice will be greater, dependent upon the capacity of the apparatus for protecting checks of larger amounts, as, for instance, checks of ten thousand or one hundred thousand dollars, etc. Also, together with other details, the arrangement of the printing disks may be varied, and many combinations may be made, constituting letters, numbers, signs, etc.

Although a preferred form of the invention has been described it is to be understood that it may be modified within the scope of the appended claim.

We claim—

In a check printing machine, the combination of a series of printing wheels each of which is provided with a series of characters, a series of indicating wheels, each of which is provided with a series of indicating characters and engages one of said printing wheels, a movable setting wheel for successively bringing each printing character into printing position and simultaneously bringing a corresponding indicating character into an indicating position, a member for imprinting said printing characters on a check, means for engaging each of said indicating wheels to retain said printing wheels in set position, spring means for returning said printing wheels to zero position, and means for simultaneously releasing all of said retaining means, whereby said printing wheels are returned to zero position.

In testimony whereof we affix our signatures.

ALBERTO BONAVIA y RIPOLL.
ARTURO BONAVIA y RIPOLL.